United States Patent Office 3,600,129
Patented Aug. 17, 1971

3,600,129
MANUFACTURE OF LOW BULK DENSITY HIGH STRENGTH SPHERICAL ALUMINA PARTICLES
Kenneth D. Vesely, Arlington Heights, and Laurence R. Steenberg, Glenview, Ill., assignors to Universal Oil Products Company, Des Plaines, Ill.
No Drawing. Continuation-in-part of abandoned application Ser. No. 579,193, Sept. 14, 1966. This application June 17, 1969, Ser. No. 834,153
Int. Cl. C01f 7/42; B01j 11/44, 11/40
U.S. Cl. 23—143                         4 Claims

ABSTRACT OF THE DISCLOSURE

Low density alumina spheres of improved crushing strength are prepared by the oil-drop method utilizing a dropping mixture comprising an alumina sol and hexamethylenetetramine, said dropping mixture having an Al/Cl weight ratio of 1:1 to 1.5:1, a hexamethylenetetramine/Cl mol ratio of 1/4–1.25/4 and an Al content of 6–10 wt. percent. After dropping, the spheres are pressure aged at a temperature of 240°–500° F. for 1–5 hours, and are then washed, dried and calcined.

RELATED APPLICATIONS

This application is a continuation-in-part application of a copending application Ser. No. 579,193, filed Sept. 14, 1966, now abandoned.

BACKGROUND OF THE INVENTION

In general this invention relates to the manufacture of spheroidal alumina particles. More particularly, this invention is concerned with a method of preparing alumina spheroidal particles of low bulk density and improved crushing strength. Alumina particles of substantially spherical shape offer numerous advantages when employed as an adsorbent, or as a catalyst or component thereof for the conversion of organic compounds, particularly hydrocarbon conversion reactions. When disposed in a fixed bed in a reaction or contact zone, the spherical particles permit a more uniform packing and reduce the tendency of reactant streams to channel through the catalyst bed. When employed in a moving bed type of operation, i.e., wherein the particles are transported from one zone into another by the reactants or an extraneous carrying medium, the spheroidal particles have a further advantage in that there are no sharp edges to break or wear off during processing thus creating a tendency to plug process equipment.

Spheroidal alumina particles are conveniently and preferably manufactured by the well-known oil-drop method as described by J. Hoekstra in U.S. Pat. No. 2,620,314. Briefly, the method comprises commingling an alumina sol and a gelling agent below gelation temperature and dispersing the mixture as droplets into a water immiscible suspending medium, usually a gas-oil, maintained at an elevated temperature whereby the sol droplets are formed into firm spherical gel particles. The spherical gel particles are thereafter subjected to one or more aging treatments whereby certain desirable physical characteristics are imparted thereto.

Hexamethylenetetramine is described as a most suitable gelling agent having a strong buffering action at a pH of from about 4 to about 10 and a rate of hydrolysis increasing with temperature. Thus, the sol-hexamethylenetetramine mixture is dispersed as droplets while still below gelation temperature into the oil suspending medium maintained at an elevated temperature effecting hydrolysis of the hexamethylenetetramine and accelerating gelation of the sol into firm gel particles. During the subsequent aging process the hexamethylenetetramine retained in the spheres continues to hydrolyze to ammonia, carbon dioxide, and amines. Generally, a complete aging treatment comprises retaining the gel spheres in the oil suspending medium in a separate vessel for an extended period and thereafter in an aqueous alkaline medium for a further extended period, and finally water washing the spheres to remove soluble salts. The particles are subsequently dried and treated at calcination temperature.

It is in many cases desirable, particularly in the processing of heavier hydrocarbon fractions, to employ spheroidal alumina particles of low bulk density and consequent large pore diameter. The free space thus available permits the large hydrocarbon molecules access to catalytic sites within the particles. In those processes including a catalyst regeneration cycle, carbon burn-off is more readily accomplished.

The problem with which the present invention is concerned arises when it is attempted to produce low bulk density spheroidal alumina particles by the described oil-drop method which are attrition resistant and of sufficient crushing strength to withstand the rigors of petroleum refining processes. The described oil-drop method can be employed to manufacture low density spheres by certain process modifications although such spheres are somewhat deficient in crushing strength as will appear with reference to the examples appended hereto. However, in the manufacture of the low density spheres, i.e, less than 0.5 gm./cc., a two-step aging process is necessitated. Thus, the spheres are initially aged in the suspending medium in the presence of hexamethylenetetramine and thereafter in an ammonium hydroxide solution (liquid alkaline aged). High density spheres, i.e., in excess of 0.7 gm./cc. are recovered in the absence of the liquid alkaline age. The subsequent related art makes reference to pressure aging as an expedient to lessen the time required for adequate aging and to eliminate the liquid alkaline age step, the latter being considered an essential process modification in the Hoekstra reference for the manufacture of low density spheres. The prior art does not provide any teaching of the present invention which combines pressure aging in combination with other process modifications and limitations to provide low density spheres characterized by an exceptional crushing strength.

SUMMARY OF THE INVENTION

In one of its broad aspects, the present invention embodies a method of preparation which comprises digesting aluminum in an acid chloride selected from the group consisting of hydrochloric acid and aluminum chloride in aqueous solution and forming an alumina sol comprising aluminum in from about a 1.0/1 to about a 1.5/1 weight ratio with the chloride content thereof; separately preparing an aqueous solution of hexamethylenetetramine; commingling the hexamethylenetetramine solution with the alumina sol at below gelation temperature in an amount to provide a hexamethylenetetramine-chloride mol ratio of from about 1:4 to about 1.25:4 and to effect substantially complete neutralization of said chloride, and in a concentration so that the resulting mixture comprises from about 6 to about 10 wt. percent aluminum; dispersing said mixture as droplets into a water immiscible suspending medium at a temperature of from about 120° F. to about 220° F. and retaining the droplets therein until they set into spherical gel particles; aging said particles at a temperature of from about 250° F. to about 500° F. and at a pressure to maintain the water content of said particles in the liquid phase and effecting substantially complete hydrolysis of the residual hexamethylenetetramine.

In accordance with the method of this invention, aluminum is initially digested in aqueous hydrochloric acid and/or aqueous aluminum chloride solution to form an alumina sol containing aluminum in from about a 1.0/1 to about 1.5/1 weight ratio with the chloride content thereof. One preferred method of sol preparation comprises commingling aluminum pellets with a quantity of treated or deionized water and adding thereto a concentrated hydrochloric acid solution sufficient to establish the desired aluminum-chloride weight ratio, and at about reflux temperature to effect the desired reaction at a suitable rate. In general, the temperature will range from about 190° F. to about 240° F.

One of the essential features of this invention concerns the aluminum content of the mixture resulting from admixing the alumina sol and the aqueous hexamethylenetetramine solution as hereinafter described. The aluminum content of the mixture can be determined at the initial aluminum digestion step or subsequent thereto as will hereinafter appear. For example, a weighed amount of aluminum pellets may be digested in hydrochloric acid in sufficient quantity to establish a desired aluminum-chloride ratio, and water in sufficient quantity to establish a sol with a particular aluminum concentration such that upon further dilution with the aqueous hexamethylenetetramine solution of known concentration, preferably from about 28 to about 40% by weight of hexamethylenetetramine, a mixture containing from about 6 to about 10 wt. percent aluminum will result.

As previously mentioned, the hexamethylenetetramine is separately prepared in aqueous solution and thereafter commingled with the alumina sol at below gelation temperature. The hexamethylenetetramine is utilized in an amount sufficient to effect substantially complete neutralization of the chloride contained in the alumina sol upon total hydrolysis of said hexamethylenetetramine and preferably in an amount equivalent to from about ¼ to about 1.25/4 mol ratio with said chloride. Also, as has been stated, the hexamethylenetetramine solution preferably comprises from about 28 to about 40% by weight of hexamethylenetetramine, the particular concentration being such as to insure a sol-hexamethylenetetramine mixture comprising from about 6 to about 10 wt. percent aluminum as aforesaid.

The mixture thus prepared as thereafter formed into spheroidal alumina gel particles by the described oil-drop method. Pursuant to the method of this invention, the spherical gel particles thus prepared are aged, preferably in the oil suspending medium, at a temperature of from about 240° to about 500° F. and at a pressure to maintain the water content of said particles in the liquid phase. Substantially complete hydrolysis of the hexamethylenetetramine occurs to form ammonia, amines and carbon dioxide within the aforesaid temperature range, the temperature preferably not exceeding about 350° F. A temperature in the preferred range is suitably employed at a pressure of from about 40 to about 150 p.s.i.g. and sufficient to maintain the water content of the particles in a substantially liquid phase. The spheroidal gel particles are suitably aged at the described conditions of temperature and pressure within a period of from about 1 to about 5 hours.

After the aging treatment the spheres are washed in any suitable manner. A particularly satisfactory method is to wash the spheres by percolation either with an upward or downward flow of water, and preferably with water containing a small amount of ammonium hydroxide and/or ammonium nitrate. After washing, the spheres may be dried at a temperature of from about 200° to about 600° F. for 6–24 hours or more, or dried at this temperature and calcined at a temperature of from about 800° to about 1400° F. for 2–12 hours or more, and then utilized as such or composited with other catalytic components. It is preferred that the spheres be dried slowly and also that the drying be effected in a humid atmosphere because this has been found to result in less breakage of the spheres.

The following examples are presented in further illustration of the method and advantages of this invention and are not intended as an undue limitation on the generally broad scope of this invention as set out in the appended claims.

Example I

One hundred pounds of aluminum pellets were digested in hydrochloric acid and water to form an alumina sol containing 13.75 weight percent aluminum in a 1.3/1 weight ratio with the chloride content thereof. The aluminum pellets were charged to a digester followed by the addition of 432.3 pounds of treated water and thereafter the slow addition of 207.8 pounds of concentrated hydrochloric acid. The reactants were circulated in the digester while maintaining the temperature at about 215° F. until aluminum digestion was substantially complete as evidenced by the evolution of approximately 11 pounds of hydrogen. In a separate vessel, 79.74 pounds of hexamethylenetetramine was prepared in aqueous solution with 205.1 pounds of water and thereafter commingled with the aforesaid alumina sol, the resulting mixture being maintained at 42–44° F. The mixture, containing 9.86 weight percent aluminum, was emitted as droplets into a forming tower filled with a gas-oil suspending medium maintained at about 194° F. Spherical alumina gel particles were recovered from the bottom of the forming tower and aged in a portion of the oil suspending medium in a separate vessel for a period of 3.13 hours at a temperature ranging from 175° F. to 306° F. and at a pressure of 60 p.s.i.g. The aged spheres were thereafter washed with a flow of water charged to the vessel, 5 gallons of water per pound of alumina being charged to the vessel over a period of 1.19 hours. The water-wash was at 200° F. and the effluent stream had a pH of 9.2. The spheres were thereafter recovered, dried for one hour at about 375° F., and calcined for 1 hour at 650° F. and then at 1250° F. for 2 hours.

Following this calcination treatment at elevated temperature, the spheres were subjected to a standard test procedure to determine crushing strength. The average crushing strength of the alumina particles was determined as the arithmetic average of the force required to crush each particle of a given number of individual particles. Each particle was crushed in an apparatus constructed in such a manner that the force was applied continuously and at a uniform rate beginning with a zero load. The crushing strength apparatus consists essentially of a balance beam resting on a knife edge. The knife edge is located at unit distance from an anvil on which the alumina particle is placed. A cup, which receives lead shot by which the load is applied, is situated on the other side of the knife edge, four times the unit distance therefrom. This lead shot falls into this cup from a hopper at a rate of about nine pounds per minute, thus loading the alumina particles at a rate of about 36 pounds per minute. A single particle is placed on the anvil of the apparatus, and the beam balanced by means of a small spirit level. Force is applied to the particle by opening the shutter in the bottom of the hopper containing the lead shot, thus allowing the lead to flow in a continuous stream into the cup. The flow of lead shot is immediately and automatically cut off when the particle is completely crushed. The weight of lead shot within the cup is multiplied by a factor of four to give the actual crushing strength of the particle. The procedure is repeated 60 times and the crushing strength is taken as the arithmetic average of the observed individual crushing strengths.

The average bulk density (ABD) of the calcined spheres was determined by the standard method whereby the spheres are measured into a tared 100 cc. cylinder and the weight of said spheres is thereafter determined. The procedure is repeated three times and the average weight recorded. The ABD is reported as gm./cc.

The crushing strength and ABD are recorded below under "Catalyst A" in the following table.

Example II

An alumina sol was prepared in the same manner as described in Example I to yield an alumina sol containing 13.75 weight percent aluminum in a 1.3/1 weight ratio with the chloride content thereof. As in Example I, 79.74 pounds of hexamethylenetetramine was prepared in aqueous solution. In this case 465.3 pounds of water was used. The hexamethylenetetramine solution was commingled with the alumina sol at 42–44° F., the resulting mixture containing 7.86 weight percent aluminum. Spherical alumina gel particles were formed by the oil-drop method at the conditions set out in Example I and aged, washed, dried and calcined as described. The crushing strength and ABD were determined and are recorded below under catalyst "B" in the following table.

Example III

An alumina sol was prepared in the same manner as described in Example I to yield an alumina sol containing 13.75 weight percent alumina in a 1.3/1 weight ratio with the chloride content thereof. As in Example I, 79.74 pounds of hexamethylenetetramine was prepared in aqueous solution. The hexamethylenetetramine solution was commingled with the alumina sol at 42/44° F. the resulting mixture containing 6.0 weight percent aluminum. Spherical alumina gel particles were formed by the oil-drop method at the conditions set out in Example I and aged, washed, dried and calcined as described. The crushing strength and ABD are recorded below under catalyst "C" in the following table.

Example IV

Spheroidal alumina particles were prepared in the conventional manner. Thus, 56 volumes of an alumina sol, prepared substantially as described in Example I and containing 12.03 wt. percent aluminum in a 1.25 weight ratio with the chloride content thereof, was commingled with 44 volumes of a 28 wt. percent aqueous hexamethylenetetramine solution at about 80° F. The resulting mixture contained 7.4 wt. percent aluminum. The mixture was emitted as droplets into a forming tower filled with a gas-oil suspending medium maintained at about 210° F. and at atmospheric pressure. Spherical gel particles were recovered from the forming tower and aged in a portion of the oil suspending medium in a separate vessel for about 22 hours at 210° F. The spheres were further aged at about 204° F. for 3½ hours in an aqueous ammonia solution comprising 1.75 wt. percent ammonia. All aging was at atmospheric pressure conditions. The spheres were thereafter washed with dilute aqueous ammonia (8.0–8.5 pH) at 210° F., dried at 375° F. for 1 hour and calcined for 1 hour at 650° F. and then at 1250° F. for 2 hours. The crushing strength and ABD were determined and are recorded below under catalyst "D" in the following table.

TABLE

| Catalyst | A | B | C | D |
|---|---|---|---|---|
| Al content (sol.-HMT mixture), wt. percent | 9.9 | 7.85 | 6.0 | 7.4 |
| Calcined catalyst: | | | | |
| ABD, gms./cc | .27 | .29 | .33 | .22 |
| Crushing strength, lbs | 16.6 | 9.5 | 10.5 | 5.7 |

The low bulk density alumina spheres of improved crushing strength prepared in accordance with the present method may be used as a catalyst or component thereof to effect hydrocarbon conversion, particularly when composited with a catalytically active metal such as molybdenum, tungsten, chromium, iron, nickel, cobalt, platinum, palladium and the like. The spheres are particularly useful as a catalyst carrier material in the hydrocracking of heavy oils, including vacuum residuals, to form petroleum products in the middle distillate range, utilizing temperatures of from about 500° F. to about 1000° F. and at pressures of from about 500 p.s.i.g. to about 3000 p.s.i.g. The low bulk density alumina spheres are also useful as catalysts or as catalyst supports in a large variety of hydrocarbon converion processes involving reaction conditions comprising a temperature in the 70–1400° F. range. Said hydrocarbon conversion processes include the polymerization of olefins, particularly ethylene, propylene, 1-butene, 2-butene, isobutylene and also higher boiling olefins, at polymerization reaction conditions; the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, amylenes, and higher boiling olefins including nonenes, decenes, undecenes, etc., the foregoing alkylation reactions being effected at alkylation conditions disclosed in the art. These spheroidal alumina particles are also effective in the isomerization of paraffins, particularly n-butane, n-pentane, n-hexane, n-heptane, n-octane, etc., or mixtures thereof, including isomerization of less highly branch chain saturated hydrocarbons to more highly branched chain saturated hydrocarbons such as the isomerization of 2- or 3-methylpentane to 2,3- and 2,2-dimethylbutane; isomerization of dimethylcyclohexane to methylcyclohexane, isomerization of methylcyclopentane, to cyclohexane, etc., at isomerization reaction conditions. The low density spheroidal alumina particles are also particularly useful as a catalyst or component thereof for the elimination of products of incomplete combustion occurring in the hydrocarbonaceous exhaust gases which emanate from an internal combustion engine, or occurring in industrial waste gases.

We claim as our invention:

1. A method of preparing low density spherical alumina particles of improved crushing strength which comprises (a) digesting aluminum in an acid chloride selected from the group consisting of hydrochloric acid and aluminum chloride in aqueous solution and forming an alumina sol comprising aluminum in from about a 1.0/1 to about a 1.5/1 weight ratio with the chloride content thereof, (b) separately preparing an aqueous solution of hexamethylenetetramine, (c) commingling the hexamethylenetetramine solution with the alumina sol at below gelation temperature in an amount to provide a hexamethylenetetramine-chloride mol ratio of from about 1:4 to about 1.25:4 and to effect substantially complete neutralization of said chloride, and in a concentration so that the resulting mixture comprises from about 6 to about 10 weight percent aluminum, (d) dispersing said mixture as droplets into an oil maintained at a temperature of from about 120° F. to about 220° F. and retaining the droplets therein until they set into spherical gel particles, (e) aging said gel particles in oil at a temperature of from about 250° F. to about 500° F. and at a superatmospheric pressure to maintain the water content of said particles substantially in the liquid phase and effecting substantially complete hydrolysis of the residual hexamethylenetetramine, and (f) washing and thereafter drying and calcining the aged particles.

2. The method of claim 1 further characterized with respect to step (b) in that said aqueous solution of hexamethylenetetramine comprises from about 28% to about 40% by weight of hexamethylenetetramine.

3. The method of claim 2 further characterized with respect to step (e) in that said gel particles are aged at a temperature not exceeding about 350° F. and at a pressure of from about 40 p.s.i.g. to about 150 p.s.i.g., and effecting substantially complete hydrolysis of the residual hexamethylenetetramine.

4. The method of claim 3 further characterized with respect to step (c) in that said hexamethylenetetramine is commingled with the alumina sol in an amount such that the resulting mixture comprises about 9.9 wt. percent aluminum.

References Cited

UNITED STATES PATENTS

| | | | |
|---|---|---|---|
| 2,620,314 | 12/1952 | Hoekstra | 252—448 |
| 2,865,866 | 12/1958 | Hoekstra | 252—448 |
| 3,096,295 | 7/1963 | Michalko | 252—448 |
| 3,202,480 | 8/1965 | Nixon | 23—143 |

MILTON WEISSMAN, Primary Examiner

U.S. Cl. X.R.

208—112; 252—448, 465, 466; 260—93.7, 683.64, 683.65